(12) United States Patent
Banus

(10) Patent No.: US 6,517,915 B1
(45) Date of Patent: Feb. 11, 2003

(54) COMPOSITE STONE SURFACING WITH IMPROVED OPTICAL AND WEAR RESISTANCE PROPERTIES

(76) Inventor: Christopher T. Banus, 41 Manchester St., Nashua, NH (US) 03064

( * ) Notice: Subject to any disclaimer, the term of this patent is extended or adjusted under 35 U.S.C. 154(b) by 0 days.

(21) Appl. No.: 09/699,237

(22) Filed: Oct. 27, 2000

Related U.S. Application Data

(60) Provisional application No. 60/162,510, filed on Oct. 29, 1999.

(51) Int. Cl.$^7$ .................................................. A01N 1/00
(52) U.S. Cl. .......................... 428/15; 428/87; 428/96; 428/323; 428/325; 428/327; 428/328; 428/331; 428/409; 427/393.6; 156/61; 156/62.2
(58) Field of Search .......................... 428/323, 15, 325, 428/409, 327, 328, 331, 87, 96; 427/393.6; 156/61, 62.2

(56) References Cited

U.S. PATENT DOCUMENTS

| 3,928,706 A | 12/1975 | Gibbons |
| 5,348,914 A | 9/1994 | Thometzek et al. |
| 5,445,880 A | 8/1995 | Martiny |
| 5,830,536 A | 11/1998 | Garduno |

FOREIGN PATENT DOCUMENTS

| FR | 997495 | 1/1952 |

*Primary Examiner*—Deborah Jones
*Assistant Examiner*—Abraham Bahta
(74) *Attorney, Agent, or Firm*—Maine & Asmus

(57) ABSTRACT

A decorative composite stone material, the finished face of which is more durable and requires less maintenance than previous composite stone products. The decorative component of the aggregate material is specifically limited to a hard aggregate of enhanced aesthetic appeal, specifically, to granules of quartz or other transparent or semi-transparent material having a Mohs index of at least 7, naturally occurring or synthetic. The granules of quartz are adjustably coated with a metallic, ceramic, plastic or other film, mixed with a binder, cast, and cured. In the surface finishing step, granules close to the surface are ground to create an exposed facet through which light passes in and out, the coating providing reflective properties that add color, sparkle, glitter, metallic or other visual effect to the hard composite stone surface without compromising the hardness and durability of the product.

27 Claims, 1 Drawing Sheet

COMPOSITE STONE SURFACING WITH IMPROVED OPTICAL AND WEAR RESISTANCE PROPERTIES

CROSS REFERENCE TO RELATED APPLICATIONS

This application relates and claims priority to pending U.S. application Ser. No. 60/162,510, filed Oct. 29, 1999, by the same inventor.

BACKGROUND OF THE INVENTION

1. Technical Field of the Invention

The invention relates to decorative composite stone surfacing materials composed of a binder and decorative hard aggregates; more particularly it relates to a composite stone material made using a decorative hard aggregate composed of pieces of quartz or other materials of equal or greater hardness that have been coated with materials affecting the light reflection within the pieces.

2. Background Art

Composite stone refers to materials composed of a binder and appropriate stone or synthetic aggregates that when mixed together form a semi-liquid or paste consistency that can be applied to a floor or other substrate, or placed in a mold to make either flat, two dimensional plates for use as tiles or sheets, or three dimensional objects such as statues or blocks. The mixture is then cured by an appropriate method to a hardened, unfinished state as in cross section FIG. 1, and then the surface is ground to reveal the decorative qualities below the rough surface, as in cross section FIG. 2. Two dimensional tiles and sheets, and three dimensional objects, are widely produced in several areas of the world and are variously known as composite stone, agglomerated stone, manmade stone, polymer cement or terrazzo. The ratio of binder to aggregates commonly ranges from 5–50% binder to 50–95% aggregates, by volume.

The current technologies for producing composite or agglomerated stone utilize cements, epoxy, polyester, acrylic and other modern binders to hold the aggregates together in forming the composite stone. Methods of production range from simple mixing and molding to more advanced molding with vibration or molding using vacuum, vibration, and/or pressure techniques. Subsequently the binder is caused to harden by a method and time appropriate to the binder, and the resultant hardened composite stone can be further worked by grinding and polishing, to produce a visible surface with desired finish from rough ground to highly polished and glossy.

Whatever the method, the resulting composite stone has various looks and physical/chemical characteristics depending upon the choice of binder and aggregates. Various pigments, additives, fibers or other proprietary modifying components can be added to the mixture to achieve desired colors, manufacturing ability, cost reductions, or physical/chemical properties for the composite stone.

Terrazzo is an ancient form of composite stone, well known and widely utilized since Roman times. Originally most terrazzo was made from cement binder, marble and pigments. The mixture was spread on a substrate, hardened and ground. This method is still used today and is referred to as "poured-in-place" terrazzo. The mixture can be applied to floors, walls, columns, furniture, stairs etc and then ground and polished after hardening. Such mixtures have also been placed in molds to form tiles, slabs, and blocks—which can be subsequently sliced into slabs or tiles for polishing. Composite stone stairs, containers, tabletops, furniture, statues and the like are common, and are referred to as pre-fabricated, pre-cast or pre-formed terrazzo items.

In this century the cement has often been replaced with plastic binders such as epoxy, polyester, urethane, acrylic or other resins in order to improve characteristics of the finished composite stone material or to aid in production, as either poured-in-place or for pre-cast composite stones. Prior to this century and the advent of electric grinding machinery and modem grinding abrasives, the grinding and polishing was done by hand labor and therefore most of the aggregates were relatively soft such as marble, sea shells or glass. With the advent of electric grinding equipment and modem grinding abrasives harder aggregates such as granite and quartz are being used in the production of composite stone, both poured-in-place and pre-cast.

Over the last 40 years, up to about 10 years ago, the production of pre-cast composite stone was done with soft aggregates, which enabled it to be cast in the form of large blocks and then sliced into slabs nominally 0.3 to 4.0 cm in thickness; or as slabs and tiles, again typically in thickness from 0.3 to 4.0 cm, and in dimensions ranging from 12×12 inches up to 6×15 feet or larger. It wasn't until recent improvements in diamond, cubic-borne nitride and silicon carbide and other grinding and polishing media that make calibrating, grinding, polishing and cutting of hard aggregates possible and cost effective.

The production and consumption of pre-cast tiles and slabs of composite stone, now about 100 million square feet per year, is a significant and growing part of the overall production of surfacings for floors, walls, exterior walls, counter tops, furniture, partitions and other architectural elements for the building construction industry. Producers of composite stones have devised various methods to provide improved or different appearances, and physical and chemical characteristics of these composite stones by using as the aggregate in the binder-aggregate mixture such materials as pieces of glass, mirror, plastic, and metal, in addition to the traditional aggregates of marble, granite, quartz, or other stones and minerals.

In general, composite stone can be divided into two groups—hard and soft. "Hard" composite stone contains aggregates and fillers such as quartz, granite, Aluminum Oxide or other minerals, natural or synthetic, with a Mohs hardness index (traditional, non-linear, scale of hardness where by definition talc=1, quartz=7 and diamond=10) of 6 or 7 and higher. "Soft" composite stones contain aggregates and fillers such as marble, glass, sea shells, plastic, metal with Mohs index typically less than 6 or 7. For context, consider that for marbles, glass, and the like, the Mohs index is usually in range of 3.0 to 5.5 or so.

The practical distinction is that in general, dirt and sand which comes into contact with such surfaces, whether the composite stone is used on the floor or on countertops, is composed largely of quartz, Mohs 7, that can easily scratch, abrade or destroy the surface of soft composite stones. Quartz is the most abundant mineral on the planet; and is a common component to dirt, dust, and grit in all parts of the world. Especially on walls and countertops and furniture having such decorative surfaces; abrasive agents used in many cleaning agents, knife edges, and other articles coming into contact with the surface, and of course the inevitable dirt, dust and grit, are sufficiently hard to scratch these Mohs 3–5 materials, causing accumulating damage and wear to such soft composite stone surfaces.

The following hard and soft composite stone materials are well known and commonly used in the industry, today. Their characteristics are described here giving the requisite usefulness from an aesthetic or durability point of view.

Group 1. Marble aggregates—soft composite stone—marble has a hardness of 3–4 on Mohs scale and therefore is easy to grind and polish but also is also easily scratched when used on a floor or other area subject to abrasion. Marble is also absorbent and therefore easily stained and also subject to attach by even mild acids. Until about 1990, marble was the principle aggregate used in nearly all decorative composite stone production.

Group 2. Marble aggregates with addition of pieces of glass, mirror, metal, mother of pearl plastic, constitutes a soft composite stone. The glass, mirror or plastic can be colorless or colored and from clear/transparent to cloudy/nearly opaque. The metal or mother of pearl or soft (less than 7 Mohs) semi-precious stones come in many colors. The percentage of the added non-marble aggregates can be from a few percent as random dots on the surface, up to constituting most or all of the required aggregate in the composite stones aggregate-binder mixture. Products where the binder is a cement or plastic resin and the aggregate is partly, substantially, or wholly made from glass or mirror powder, granules or cullet have been produced by several firms for more than 10 years.

Group 3. Quartz, granite and other hard mineral aggregates—hard composite stone—are now widely used as the aggregates in many types of composite stone because they have a Mohs hardness of 6 or higher and are highly resistant to abrasion and scratching, and are resistant to many chemicals, especially acids. In some cases the aggregate is quartz sand, without particular attention to aesthetic appeal, and the binder is a resin selected for exceptional chemical or heat resistance to make a composite stone material, referred sometimes as polymer cement, used for its thermal or chemical properties rather than decorative architectural application.

The use of glass chips in traditional poured-in-place terrazzo is well known in the industry for over 100 years. None the less, at least one recent patent attempts to distinguish the use of mirrors as a decorative aggregate material from the prior art. Martiny's U.S. Pat. No. 5,445,880, COVERING WITH IMPROVED OPTICAL QUALITIES, issued Aug. 29, 1995, claims mirror-coated glass as a decorative component to a composite stone surfacing material. However, earlier patent art, LECHAT's French Pat. No. 997,495, NEW AGGLOMERATE AND ITS MANUFACTURING PROCESS, published Jan. 7, 1952, notably not cited in Martiny's U.S. case, speaks of pre-coating transparent particles or granules of aggregate with selected films, which after having an exposed side of a granule and its film covering opened by polishing of the decorative surface of the hardened agglomerate, light, as here translated from the French, "penetrates through the granules, is reflected on the opaque film, and passes back through the granules. . ." According to LECHAT, as here translated, the transparent granules "may be made of glass, and consist, in this case, of broken bottle glass (green glass), broken window glass, gilded or silvered mirrors, etc., ground and size sorted or of any natural or synthetic transparent material, particularly methyl polymethacrylate, cellulose acetate, etc."

The weakness of all group 1 and 2 type soft composite stones is a combination of their relative softness and susceptibility to scratching and abrasion from common dust, dirt and grit, and to staining and chemical attach. Group 3 materials are less so, and this is the reason that many producers of composite stone have changed in the last 10 years or so to using the harder Group 3 quartz/granite class of aggregates for non-decorative purposes, specifically for better resistance to chemicals and to abrasion. The Martiny and Lechat disclosures refer to the use of glass and softer materials for decorative purposes, their disclosures claiming reflective properties through the polished facets of the coated particles, but fail to point out or anticipate in any way the relative benefits of expressly specifying harder versus softer decorative aggregate materials.

It is useful to consider that in their time, LECHAT and even MARTINY were likely unappreciative and unable to address the problem of durability/resistance to dirt of the decorative materials they described. The state of the art at those times with regard to composite stone materials was that soft (Mohs index less than 7) aggregates where the only materials used for decorative purposes. There are over 30 plants worldwide that have been producing marble composite stone for 20–30 years, with a total annual output of more than 150,000,000 square feet per year. The diamond and silicon carbide grinding media technologies necessary to produce hard aggregate composite stone materials did not exist in LECHAT's time.

This explains why there is no awareness or discussion of the dirt hardness factor by either of these disclosures. Basically, until the 90's, with the exception of GRANITECH in the late 80's, the use of hard aggregates in composite stone was quite rare and new. It was just too difficult to make. LECHAT was clearly interested in glass and the then new plastics as decorative elements to his stone, without regard for the hardness and durability issues. This also explains generally why producers of otherwise hard aggregate (Mohs index of 6 or higher) composite stones, are adding glass, mirror, metal, plastic, or other soft (Mohs 3–7) decorative aggregates in order to improve the aesthetic appearance of the finished composite stone, at the expense of its durability.

In summary, the addition of glass, mirror, plastic or other soft aggregates to an otherwise potentially hard composite stone mixture for aesthetic appeal, makes the finished product more susceptible to abrasion and scratching, and therefore reduces the longevity and abrasion resistance of the overall composite stone surface. This is especially noticeable when the composite stone is used on floors or countertops subject to abrasion. In such cases the soft-aggregate pieces become dull, scratched or abraded away thus reducing the usefulness and value of the otherwise hard composite stone material.

SUMMARY OF THE INVENTION

For the purpose of describing and claiming the invention, a "hard" material, mineral, compound, or aggregate is defined as one having a Mohs hardness index of at least seven (7), by definition equivalent to quartz. While scientists do use other scales for quantifying absolute hardness, quartz is the common material in much dirt which a durable composite stone must withstand, is a defining standard of the Mohs scale, and the Mohs scale is familiar to those skilled in the art, so this traditional standard is appropriate for this disclosure.

The word "transparent", when used herein without other qualification or context, means having some visible degree of transparency ranging from clear to translucent to nearly opaque, but short of being fully opaque.

It is an object of the current invention to provide a decorative composite stone material and method that produces a finished product, the decorative face of which is more durable and requires less maintenance, at less cost, than previous products. It is a further object to provide hard aggregates of enhanced aesthetic appeal for use in decorative, hard-aggregate composite stones. Specifically, the invention consists in providing as a decorative component of the aggregate, pieces of quartz, or other transparent material having a Mohs index of at least 7, whether naturally occurring or synthetic, in sizes from 0.001 mm to 25 mm diameter, which are coated with metal, ceramic, plastic or other material in such a way as to produce a coated particle which, when one side of a granule is ground and polished to expose an uncoated facet or window through which light passes into and out of granule, reflected off the coating on the unexposed portions of the granule, it provides reflective, colored, or reflective and colored properties. When incorporated into a hard-aggregate composite stone, these pieces of coated quartz or other hard aggregate add color, sparkle, glitter, metallic or other visual effect to the hard composite stone surface after grinding and polishing, without compromising the hardness and durability of the product.

The pieces of quartz so coated can be quartz which is entirely transparent; partly transparent or slightly milky; or nearly opaque, typically being either opaque white, tan, or other naturally occurring or synthetic quartz color. The color and transparency of the basic quartz, when combined with the various named coatings, creates a wide range of color-aesthetic particles or elements which can be incorporated into the hard-aggregate composite stone thereby providing an enhanced visual effect in the composite stone while maintaining the high abrasion and chemical resistance of the overall composite stone. Also, the sizes of the pieces of coated quartz, ranging from 0.001 mm to 25 mm diameter, enable a wide range of visual effects in the composite stone.

A discovery core to the invention, stated in a conclusory manner, is that quartz, the most common mineral on earth, is the dividing line between high cost and low cost maintenance composite stone floors. Composite stone flooring made using traditional soft aggregates such as marble, quickly lose their luster and shine under the grind of quartz-ladened grit and dirt, requiring frequent and expensive maintenance to restore the original appearance. A quartz-hard aggregate composite stone floor is highly resistance to the same factors, and will require substantially less effort, translating to lower cost, to maintain its appearance.

Still other objects and advantages of the present invention will become readily apparent to those skilled in this art from the following detailed description, wherein I have shown and described only a preferred embodiment of the invention, simply by way of illustration of the best mode contemplated by me on carrying out my invention. As will be realized, the invention is capable of other and different embodiments, and its several details are capable of modifications in various obvious respects, all without departing from the invention.

DESCRIPTION OF THE PREFERRED EMBODIMENT

The classes of hard aggregates which are to be coated in this invention are described as follows:

1. Naturally occurring deposits of quartz, quartzite or other clear or partially transparent, hard minerals having a Mohs index of 7 or higher. These minerals can be obtained by mining, blasting and crushing large solid deposits of quartz or from mining, washing, screening deposits of quartz type sands and gravels; sometimes also followed by crushing.

2. Synthetic or manmade minerals such as white aluminum oxide, fused quartz or other hard transparent or partially transparent hard materials, again having a Mohs index of 7 or greater. Cost considerations generally dictate that naturally occurring quartz deposits will be least expensive and therefore most practical for large volume manufacturing of the enhanced appearance hard composite stones contemplated by the invention. However it is contemplated that some applications and products will support the additional cost of using more expensive natural hard aggregates such as semi-precious stone or the use of synthetic hard aggregates, stones, or gems.

The contemplated hard aggregates can be metal coated by any suitable method for depositing a thin layer of metal onto other materials such as on minerals, plastics, glass, metals, paper, et cetera, including such processes as vacuum deposition; coating from chemical solution; powder coating; and electrostatic deposition. The type of metal coating can be silver, gold, aluminum or other metals singularly or in combination or compounded to give a wide range of metallic coating colors, chemical properties or costs. The amount of coating or coating thickness can be adjusted to create enhanced appearance particles with varying degrees of color and reflectance.

Similarly, the contemplated hard aggregates can be coated with non-reflective colored coatings, such as ceramic, plastic, or powder, also known in the industry, here creating particles with a colored coating where the color intensity is controlled in the coating process to create the desired enhanced appearance effect in the finished hard composite stone. The reflective metal coatings or ceramic or plastic color coatings can be applied each by themselves or in combination, with either coating applied first, to produce the desired visual effect in the particles and in the composite stone surface overall. It should be noted that it is also known to coat small particles for decorative effect, such as for roof shingles and for the colored stones in aquariums, where it is the exterior appearance of the particle, not the interior affect on lighting, to which the coating effort is directed.

Figure 3:
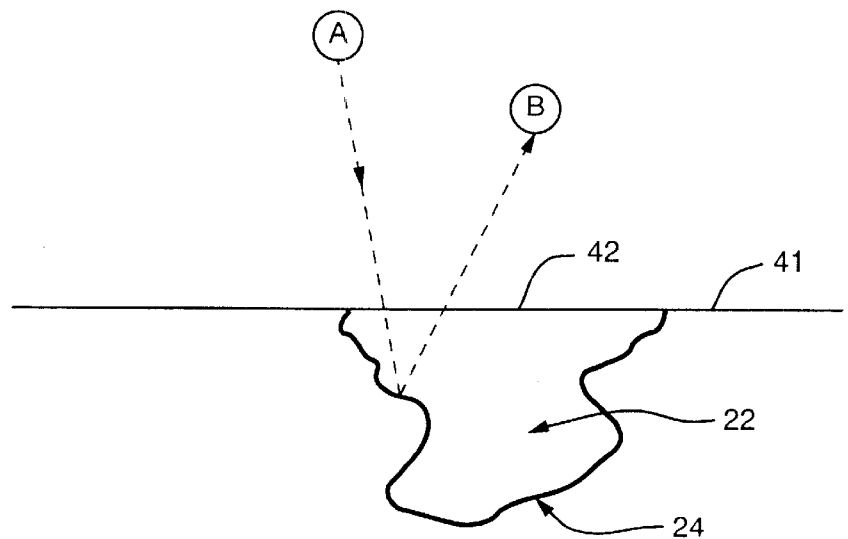
FIG. 3 is a partial cross section diagrammatic view of a metal coated, transparent granule of hard quartz embedded in the finished surface of a stone composite tile, illustrating angle A incident light and angle B reflected light passing through the hard granule.

The coated transparent or translucent hard particles or granules are then incorporated into a composite stone material production process such as is well known to practitioners skilled in the art; the material then cured or hardened, whether cast in molds or in place, and the decorative surface ground and polished for final effect. Referring to FIG. 3, those coated particles that have been opened or cut into by the grinding and polishing action that abrades away the raw surface layer, are thereby exposed in cross section to some extent on the finished surface of the hardened agglomerate. These single facet granules will permit incident light striking the surface of the composite stone to enter each granule or particle and reflect back at least some light from the surface coating on the unexposed sides of the granule.

From the viewer's perspective, looking at the decorative surface of the finished composite stone product, this reflected light will appear either as a color or metallic hue, or a reflectance full of sparkle and glitter, or a combination of both. The transparency level of the particles and their size, in combination with the type, intensity and color of the coating, will give a wide range of possible enhanced appearances for a hard composite stone surfacing material, while retaining a significantly higher resistance to wear and chemicals than agglomerates manufactured with softer decorative materials.

Figure 1:
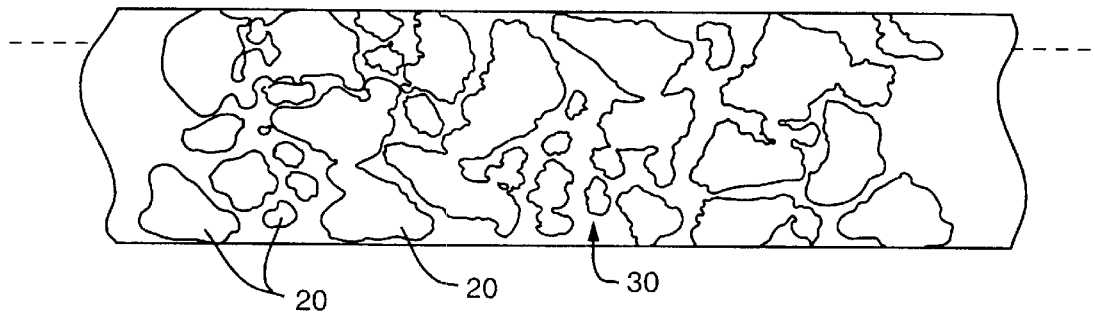
FIG. 1 is a partial cross section diagrammatic view of a raw or unpolished composite stone tile, illustrating the distribution of aggregate in the binder, below the surface.
Figure 2:
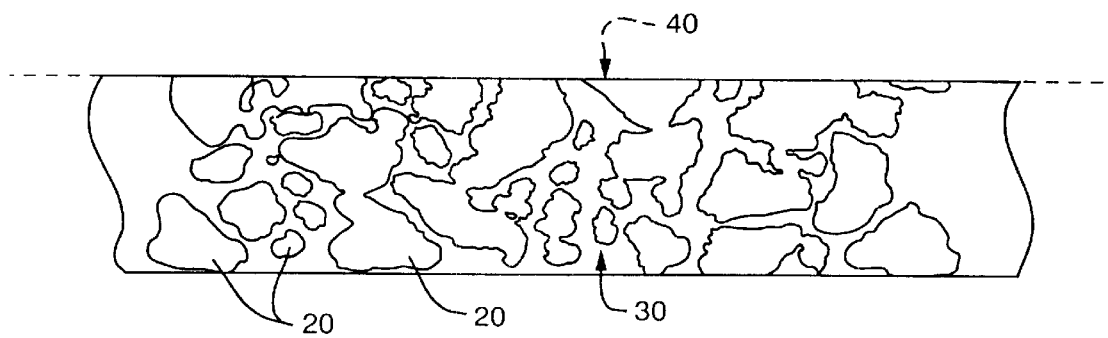
FIG. 2 is the partial cross section diagrammatic view of FIG. 1 after polishing, illustrating the phenomena of the exposed cross section of particles that were near the surface.

Referring again to the figures, FIG. 1 illustrates in cross section a cured slab or tile 10 of decorative composite stone of the invention, composed of bits and granules 20 of aggregate distributed uniformly within and held together as a solid by binder 30. FIG. 2 illustrates the effect of surface finishing of the top layer of slab 10 for decorative effect, abrading off any desired amount by grinding and polishing down to a finish surface 40.

Referring to FIG. 3, a piece of hard aggregate selected in accordance with the limitations of the invention, granule 22, which was fully enveloped by controlled coating 24 of selected materials prior to the mixing, casting and curing of slab 10 and the surface finishing process, and was by random selection, positioned adjacent to or protruding from the intended decorative surface of slab 10. During the finishing process, slab 10 has been ground down, removing binder 30 material, along with coating 24 and a portion of granule 22 material, to a finish level facet 42 of granule 22, which is planar to the finish level 41 of the adjacent binder 30 material.

In use, ambient light is admitted by any path A through facet 42, through granule 22, then being reflected, all or in part depending on its degree of transparency, by coating 24 along incident path B, presenting to the viewer all of the complexities of both natural and engineered lighting and coloring effects, emitted from a composite stone surface of Mohs 7 or more hardness.

The invention is susceptible of many embodiments. For example, there is within the scope of the invention a decorative composite stone material made from a mixture of binder and hard aggregate, or simply the hard aggregate itself prior to mixing with a binder, where the hard aggregate consists, at least in part, of transparent granules having a Mohs index of at least seven. The selected granules are within a range in size between about 0.001 and 25 mm diameter, and have an applied coating on all sides not exposed by a finishing process, as some of the coating would have been removed by the finishing process applied to the decorative surface of the finished composite stone product. The finishing process may include any of abrading, grinding or polishing, so as to smooth and shine the decorative surface, including the exposed facets of the decorative granules.

Other variations of the several embodiments may include the granules being quartz or synthetic, the coating containing at least one metal, the metal being aluminum, gold or silver, a metallic base coating with a non-metallic overcoating, or the base or sole coating be non-metallic.

As another example, there is within the scope of the invention a method of manufacturing a decorative composite stone product that includes the steps of selecting a hard aggregate from among a class of aggregates consisting of transparent granules having a Mohs index of at least seven and being in size between about 0.001 and 25 mm diameter, applying a coating to the granules so as to form coated granules, blending the coated granules into a composite stone mixture with or without other uncoated granules or granules selected from other types of aggregates, casting the mixture into a form such as an in-place casting or a mold from which the cured and hardened mixture is removed for finishing, then abrading at least one selected surface of the cured and hardened mixture so as to expose an uncoated cross section facet of at least some of the coated granules that were cast and formed adjacent to the selected surface.

As with the first example, there are many variations that include coatings with metal elements or compounds, base coatings and over coatings, means for controlling the thickness of the coating, and the application of coatings such as applying a metal coating by vacuum deposition or from solution.

The objects and advantages of the invention may be further realized and attained by means of the instrumentalities and combinations particularly pointed out in the appended claims. Accordingly, the drawing and description are to be regarded as illustrative in nature, and not as restrictive.

I claim:

1. A decorative composite stone material made from a mixture of binder and hard aggregate, said hard aggregate incorporating a decorative material component comprising transparent granules having a Mohs hardness index of at least seven, at least one surface of said composite stone material having a polished surface, said surface comprising a multiplicity of said granules wherein one side of said granules has been thereby polished to have an exposed facet, said granules being in size between about 0.001 and 25 mm diameter and having an applied coating on all sides not exposed.

2. A decorative composite stone material according to claim 1, said granules being quartz.

3. A decorative composite stone material according to claim 1, said granules being synthetic.

4. A decorative composite stone material according to claim 1, said coating containing at least one metal.

5. A decorative composite stone material according to claim 4, said metal being aluminum.

6. A decorative composite stone material according to claim 4, said metal being gold.

7. A decorative composite stone material according to claim 4, said metal being silver.

8. A decorative composite stone material according to claim 1, said coating being a metallic base coating with a non-metallic overcoating.

9. A decorative composite stone material according to claim 1, said coating be non-metallic.

10. A hard aggregate for decorative composite stone products, comprising a decorative material component consisting of transparent granules having a Mohs index of at least seven, said granules being in size between about 0.001 and 25 mm diameter, each piece having an applied coating.

11. A hard aggregate according to claim 10, said granules being quartz.

12. A hard aggregate according to claim 10, said granules being synthetic.

13. A hard aggregate according to claim 10, said coating containing at least one metal.

14. A hard aggregate according to claim 13, said metal being aluminum.

15. A hard aggregate according to claim 13, said metal being gold.

16. A hard aggregate according to claim 13, said metal being silver.

17. A hard aggregate according to claim 10, said coating being a metallic base coating with a non-metallic overcoating.

18. A hard aggregate according to claim 10, said coating be non-metallic.

19. A method of manufacturing a decorative composite stone product comprising selecting a decorative material component from among a class of decorative materials consisting of transparent granules having a Mohs index of at least seven and being in size between about 0.001 and 25 mm diameter, forming a coating on said granules, adding said coated granules to an uncured composite stone mixture, curing said mixture into a hardened mixture, abrading at least one selected surface of said hardened mixture so as to expose an uncoated cross section facet of at least some said coated granules.

20. A method of manufacturing a decorative composite stone product according to claim 19, said coating comprising at least one metal.

21. A method of manufacturing a decorative composite stone product according to claim 20, said applying said coating further comprising controlling the thickness of said metal.

22. A method of manufacturing a decorative composite stone product according to claim 20, said applying a coating comprising applying said metal by vacuum deposition.

23. A method of manufacturing a decorative composite stone product according to claim 20, said applying a coating comprising applying said metal from solution.

24. A method of manufacturing a decorative composite stone product according to claim 19, said applying a coating comprising applying a metallic base coating and applying a non-metallic overcoating.

25. A decorative composite stone product made from a mixture of binder and hard aggregate, said hard aggregate comprising a decorative material component consisting of transparent quartz granules having a Mohs hardness index of at least seven, said granules being in size between about 0.001 and 25 mm diameter and having a reflective coating applied to all sides not exposed, the finished surface of said product comprising at least some of said quartz granules with exposed uncoated sides through which exterior light may enter in and be reflected back out off said reflective coating.

26. A decorative composite stone material according to claim 25, said reflective coating containing at least one metal.

27. A decorative composite stone material according to claim 25, said coating being a metallic base coating with a non-metallic overcoating.

* * * * *

UNITED STATES PATENT AND TRADEMARK OFFICE
CERTIFICATE OF CORRECTION

PATENT NO. : 6,517,915 B1
DATED : February 11, 2003
INVENTOR(S) : Christopher T. Banus It is certified that error appears in the above-identified patent and that said Letters Patent is hereby corrected as shown below:

Column 3,
Line 10, delete "attach", insert -- attack --
Line 58, "reflected" should be italicized Column 4,
Line 2, delete "attach", insert -- attack --

Column 6,
Line 54, delete "affect", insert -- effect --

Column 8,
Line 52, delete "be", insert -- being --

Column 9,
Line 7, delete "be", insert -- being --

Signed and Sealed this

Fifteenth Day of March, 2005

JON W. DUDAS
*Director of the United States Patent and Trademark Office*